United States Patent [19]

Villette

[11] 3,833,152

[45] Sept. 3, 1974

[54] DEVICE FOR PRODUCING UNIFORM DISTRIBUTION OF PRODUCT DISSOLVING IN A CURRENT OF WATER

[75] Inventor: Guy J. Villette, Grenoble, France

[73] Assignee: Societe a Responsabilite Limitee dite Filtres Siebec, Fontaine, France

[22] Filed: Nov. 8, 1972

[21] Appl. No.: 304,656

[30] Foreign Application Priority Data
Nov. 10, 1971 France .............................. 71.40265

[52] U.S. Cl. ............................................. 222/193
[51] Int. Cl. ............................................. B67d 5/00
[58] Field of Search ............ 222/564, 190, 193, 189; 137/268, 604; 23/309, 311, 272.65, 272.5; 239/315

[56] References Cited
UNITED STATES PATENTS

| | | | |
|---|---|---|---|
| 2,120,807 | 6/1938 | Kundel | 137/268 UX |
| 2,238,969 | 4/1941 | Butterfield | 137/268 |
| 3,107,156 | 10/1963 | Fredericks | 23/311 X |
| 3,191,915 | 6/1965 | Goettl | 137/268 X |
| 3,199,957 | 8/1965 | Vivon | 137/268 X |
| 3,460,562 | 8/1969 | Moulder | 137/268 |
| 3,507,624 | 4/1970 | Schneider, Jr. et al. | 137/268 X |

Primary Examiner—Stanley H. Tollberg
Assistant Examiner—Norman L. Stack, Jr.
Attorney, Agent, or Firm—Robert E. Burns; Emmanuel J. Lobato; Bruce L. Adams

[57] ABSTRACT

A device for producing even distribution of a product dissolving in a current of water, such as a cake of chlorine serving to disinfect water in a swimming bath. The chlorine is contained in cartridges arranged in successive stages in a conduit through which the current of water flows. The upstream end of each cartridge is open to expose the chlorine to the force of the water. The cartridges are supported in the conduit by transverse baffles which axially space the cartridges apart and also direct the current of water at the centre of the exposed chlorine. In one form of the device a single cartridge is provided at each stage, supported by a baffle having a central orifice. In another form two cartridges are provided at each stage, supported by a baffle having two orifices, the cartridges and the orifices being arranged symmetrical with respect to the axis of the conduit but the cartridges being disposed 90° out-of-phase with the orifices. Each orifice may have a bush to assist in directing the current of water at a downstream cartridge.

7 Claims, 2 Drawing Figures

PATENTED SEP 3 1974　　　　　　　　　　　　　　3,833,152

DEVICE FOR PRODUCING UNIFORM DISTRIBUTION OF PRODUCT DISSOLVING IN A CURRENT OF WATER

BACKGROUND OF THE INVENTION

This invention relates to a device for producing even distribution of a product dissolving in a current of water, particularly of a disinfectant such as a cake of chlorine serving to purify water in public or private swimming baths.

For the purification of water in swimming baths, tablets of chlorine or of some other disinfectant salt are at present employed, these being placed at the bottom of the swimming pool or else in a cage mounted inside a surface skimmer. To ensure regular distribution of the disinfectant, systems are known in which the disinfectant is accommodate in a casing or container having a cylindrical or prismatic side wall, one of its ends being closed by a base and the other being open. The area of the exposed free surface of the disinfectant, as and when it dissolves in the water is, therefore constant.

A general object of the present invention is to improve the conditions for the distribution of such a disinfectant, thanks to a particular arrangement of a number of cartridges each containing a certain quantity thereof.

BRIEF SUMMARY OF THE INVENTION

According to the present invention there is provided a device for producing even distribution of a dissolvable product in a current of water, comprising a conduit; a plurality of cartridges containing the dissolvable product and arranged in the conduit in successive stages in the direction of water flow, each cartridge having an open upstream end so that an upstream surface of the product will be exposed to the current of water; and transverse baffles interposed between successive stages of cartridges to secure each stage in position in the conduit and to form in use a laminar current of water canalized towards the centre of the said upstream surface of the product at each stage.

BRIEF DESCRIPTION OF THE DRAWING

Embodiments of the prsent invention will now be described by way of example, with reference to the accompanying drawing, in which.

DESCRIPTION OF PREFERRED EMBODIMENTS

Figure 1:
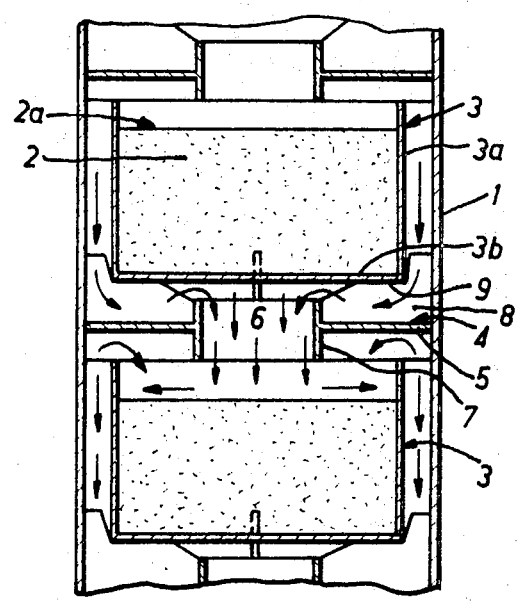
FIG. 1 is an axial section through a distributor device in accordance with the invention, comprising a succession of cartridges which contain the product to be dissolved distributed at the rate of one single cartridge at each transverse stage.

The distributor shown in FIG. 1 comprises an external vertical conduit 1 through which a current of water passes from the top downwards, in which water a product 2 is to be dissolved, such as chlorine serving to disinfect the said water. The product 2 to be dissolved forms part of a cartridge 3 having a cylindrical side wall 3a, open at the top and closed at its lower end by a base 3b. The product 2 to be dissolved may be any solid substance capable of dissolving in a current of water; it may consist of a cylindrical roll or cake subsequently introduced into the casing of the cartridge 3, or it may be compressed in the said cartridge.

The distributor to which the invention relates comprises a number of cartridges 3 arranged in succession to one another in stages in the direction taken by the flow of water, as indicated by the arrows. Only two cartridges 3 have been shown in FIG. 1 but in actual fact the distributor may comprise any number thereof, as desired. Each cartridge 3 is so arranged that its orifice faces upwards, so that upper surface 2a of the product 2 to be dissolved is left exposed to the oncoming current of water.

Each cartridge 3 is secured in position in the conduit 1 by means of transverse baffles 4 likewise forming struts. Each of these baffles comprises a transverse barrier 5 having a central orifice 6 defined by a short bush 7 integral with the barrier 5 along its inner edge. The barrier 5 is also provided with radial ribs 8 on its upper face, spaced out and each having a horizontal shoulder 9 on which the base 3b of the upper cartridge 3 seats.

The barrier 5 may also be prolonged downwards by radial ribs extending between the central bush 7 and the conduit 1, their lower edge resting on the upper edge of the lower cartridge 3 in order to secure the latter firmly.

As may be seen from FIG. 1, the water flowing from the top downwards in the direction shown by the arrows, passes through the central orifice 6 of the baffle 4, being guided in the process by the bush 7, and comes in contact with the upper surface 2a of the product 2 to be dissolved, the said contact taking place in the central part of the said surface. The flow of water is then deflected to the side, thus being caused to "lick" the surface 2a. The flow of water is then canalized by the barrier 5 of the baffle 4, which prevents it from reascending, and it passes into the gap provided between the upper edge of the cartridge 3 and the baffle 4; after which it flows downwards into the annular space defined by the side wall 3a of the cartridge 3 and the conduit 1. The current of water is then directed towards the centre by the barrier 5 of the lower baffle 4 and engages the central orifice 6 of the said baffle, being once again guided in the process by the bush 7.

It may thus be seen from the foregoing that the flow of water is canalized in such a manner as to "lick" the surface 2a of the product 2 to be dissolved, by a sweeping movement proceeding from the centre towards the periphery, thus ensuring an even and controlled distribution of the product 2 in the current of water.

The bushes 7 which extend downwards in the direction of the cartridges 3 assist the guiding of the current of water in the central part of the conduit. They could nevertheless be dispensed with and replaced by simple orifices.

Figure 2:
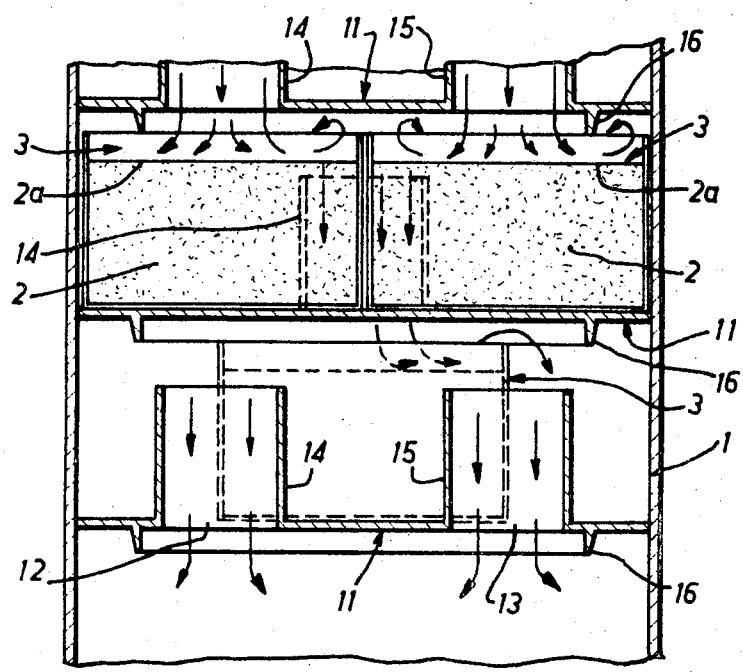
FIG. 2 is an axial section through a variant of a distributor device comprising two cartridges at each transverse stage.

In the embodiment shown in FIG. 2, two cartridges 3, each containing a mass of product 2 to be dissolved, are positioned at one and the same level or stage. The two cartridges of the same pair rest on a transverse baffle 11 having two orifices 12 and 13 which are symmetrical in respect of the axis of the conduit 1. Bushes 14 and 15 extend upwards from the orifices 12 and 13 and are integral with the circular baffle 11, to assist the guiding of the current of water. The plane passing through the axes of the bushes 14 and 15 is perpendicular to that passing through the axes of the two cartridges 3 forming one and the same pair in a given horizontal level.

As may be seen from FIG. 2, the relatie positions of the successive baffles 11 in the conduit 1 are alternately staggered by an angle of 90° in respect of one another, the same applying to the planes passing through the axes of the cartridges 3 of one and the same pair. Thus, at the upper level of FIG. 2, the plane containing the axes of the two cartridges 3 is that of the diagram, while the axes of the two bushes integral with the baffle 11 are contained in a plane perpendicular to that of the diagram. On the other hand, at the lower level, the plane of the axes of the bushes 14 and 15 is that of the diagram, while th eplane passing through the axes of the two cartridges 3 is perpendicular to that of the diagram.

Each baffle 11 is prolonged downwards by an annular rib 16, by which it rests on the nearest pair of cartridges 3 underneath.

As may be seen from the foregoing description, the current of water flowing from the top downwards, through the two upper bushes 14 and 15, is directed towards the central part of the exposed upper surfaces 2a of the product 2 to be dissolved, contained in the two upper cartridges 3, and it then sweeps over these surfaces 2a, flowing transversally. The separate currents thus formed then pass over the upper edge of each cartridge, to flow through the two bushes 14 and 15 connected to the baffle 11 on which these two cartridges rest. The same process is repeated at the subsequent lower level, thus ensuring an even and controlled dissolution of the product 2 contained in the various cartridges 3.

Needless to say, the two embodiments of the invention which have been described in the foregoing, by reference to the attached drawing, have been indicated purely for information purposes and without any limitative effect, and numerous modifications may be made thereto without thereby departing from the scope of the present invention as defined in the appended claims.

I claim:

1. A device for producing even distribution of a dissolvable product in a current of water, comprising a conduit, a plurality of cartridges for containing a dissolvable product and arranged in the conduit in successive stages in the direction of water flow, each cartridge having an open upstream end so that an upstream surface of the product will be exposed to the current of water; and transverse baffles interposed between successive stages of cartridges to secure each stage in position in the conduit axially spaced from each other and to form in use a laminar current of water canalized towards the center of the said upstream surface of the product at each stage, and said transverse baffles each having tubular means provided with an opening disposed opposed to the next successive cartridge downstream thereof in position to flow a stream of water directed at the upstream surface of said product in said next successive cartridge downstream thereof.

2. A device in accordance with claim 1, in which each baffle supports one single upstream cartridge and rests on an upstream edge of one single downstream cartridge.

3. A device in accordance with claim 1, wherein each tubular member provided with an opening has a centrally disposed tubular bushing coaxial with the conduit and extending on each side of the support, for canalizing in use the laminar flow of water in the central part of the corresponding baffle.

4. A device in accordance with claim 1, in which each baffle comprises an annular barrier, radial ribs borne by the upstream surface of the said barrier and extending upstream, and a houlder on each of the said ribs and on which the base of an upstream cartridge is supported.

5. A device in accordance with claim 1, in which each baffle supports at least two cartridges arranged symmetrical in respect of the longitudinal axis of the conduit distributed evenly around the said axis, intermediate orifices being provided in each baffle in gaps left between the cartridges.

6. A device in accordance with claim 5, in which said tubular means provided with an opening comprises tubular bushings forming prolongations of openings therein in order to canalize in use the flow of water.

7. A device in accordance with claim 6, in which each baffle supports two cartridges arranged symmetrical in respect of the axis of the conduit and is provided with two diametrically opposite tubular bushings of which the axes are contained in a plane perpendicular to that passing through those of the two cartridges, the planes containing the axes of the successive pairs of cartridges accommodated in the conduit being alternately staggered by an angle of 90° in respect of one another.

* * * * *